H. BEWLAY.
SECONDARY WINDING FOR INDUCTION MOTORS.
APPLICATION FILED MAY 18, 1918.
1,381,785. Patented June 14, 1921.
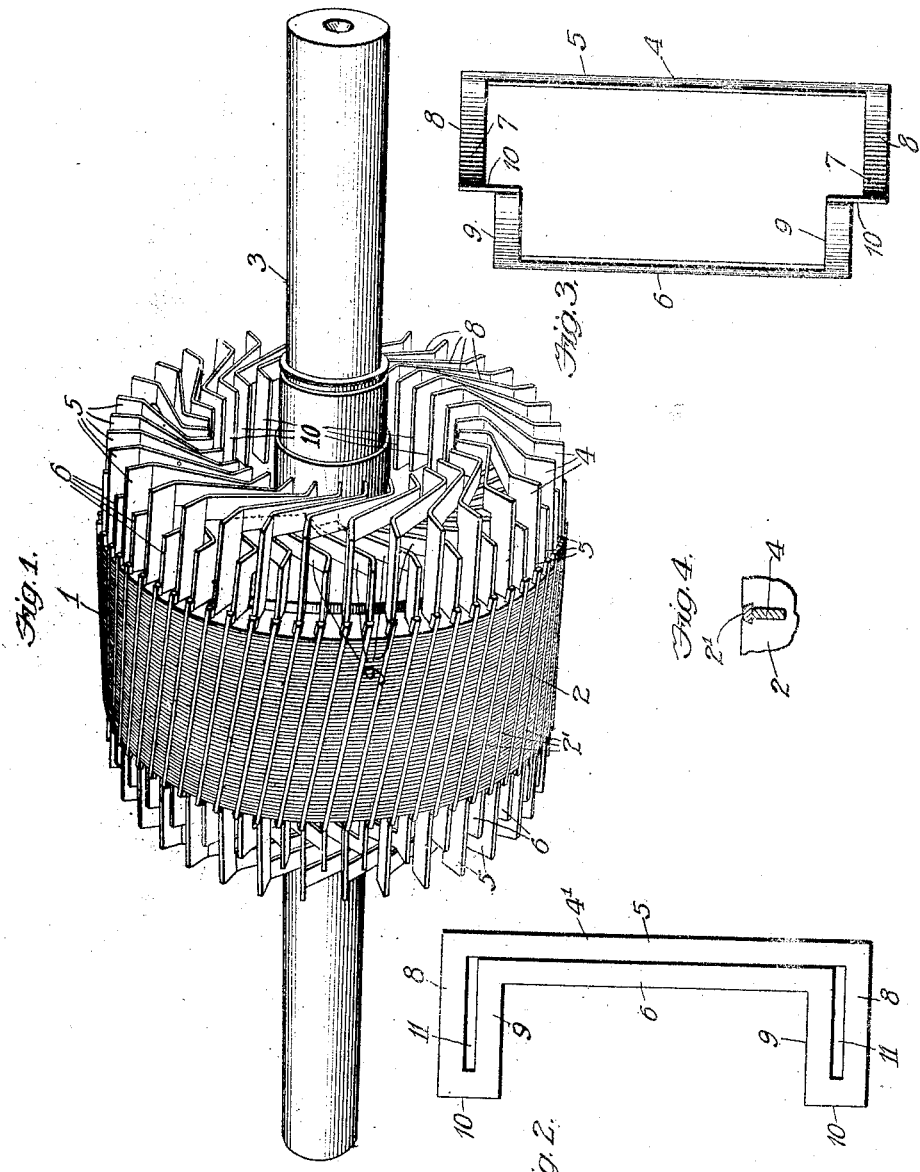
WITNESS
Fred M. Davis.
INVENTOR
Henry Bewlay
BY
Kummler & Kummler, ATTORNEYS.

C. A. BRACONIER.
BELLOWS ACTUATED SWITCH.
APPLICATION FILED SEPT. 14, 1918.
1,381,789.                    Patented June 14, 1921.
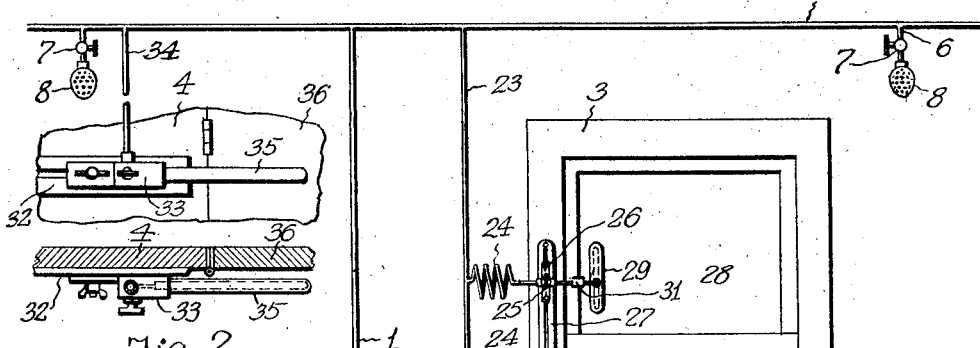
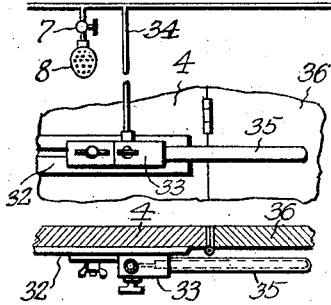
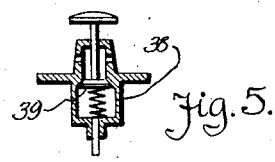
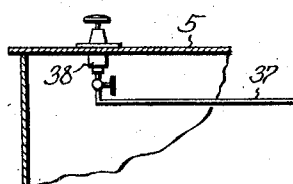
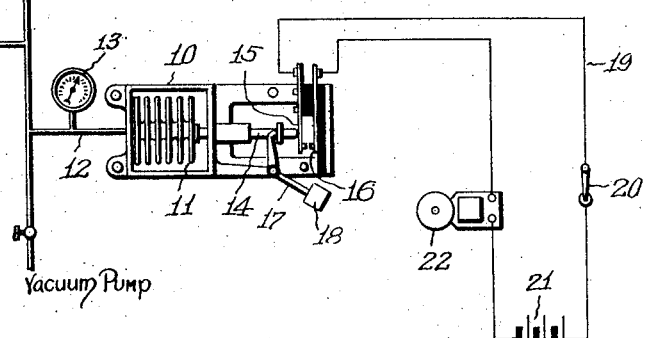
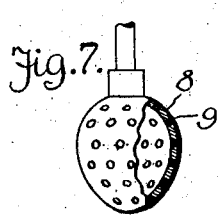
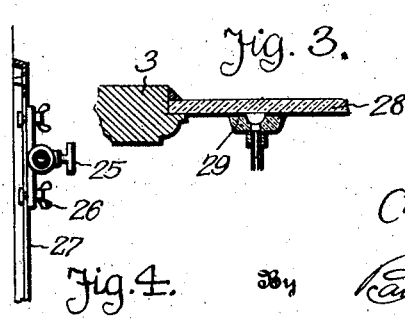
Inventor
Clarence A. Bracopier,
By
Attorneys
Witness
Karl H. Butler
Anna M. Dorr.